(12) United States Patent
Sasagawa et al.

(10) Patent No.: US 11,172,099 B2
(45) Date of Patent: Nov. 9, 2021

(54) IMAGE PROCESSING APPARATUS INCLUDING USER AUTHENTICATION, METHOD OF CONTROLLING THE SAME, AND STORAGE MEDIUM

(71) Applicant: CANON KABUSHIKI KAISHA, Tokyo (JP)

(72) Inventors: Naoto Sasagawa, Kashiwa (JP); Atsushi Ikeda, Toride (JP); Takeshi Kogure, Toride (JP); Hiroaki Koike, Kokubunji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/434,561

(22) Filed: Jun. 7, 2019

(65) Prior Publication Data

US 2020/0007713 A1    Jan. 2, 2020

(30) Foreign Application Priority Data

Jun. 29, 2018  (JP) .............................. JP2018-125291

(51) Int. Cl.
*H04N 1/44* (2006.01)
*H04N 1/00* (2006.01)
*G06F 21/84* (2013.01)

(52) U.S. Cl.
CPC ............. *H04N 1/444* (2013.01); *G06F 21/84* (2013.01); *H04N 1/00114* (2013.01); *H04N 1/4413* (2013.01); *H04N 1/4433* (2013.01)

(58) Field of Classification Search
None
See application file for complete search history.

(56) References Cited

U.S. PATENT DOCUMENTS

| 10,257,388 | B2 | 4/2019 | Hosoda et al. |
| 2010/0053692 | A1* | 3/2010 | Machiyama ....... H04N 1/32112 358/403 |
| 2016/0065788 | A1* | 3/2016 | Hosoda ................ H04N 1/4433 |
| 2016/0255075 | A1* | 9/2016 | Jiang ..................... H04L 63/101 726/6 |
| 2017/0111531 | A1* | 4/2017 | Mitsuke ............ H04N 1/00798 |
| 2017/0270290 | A1 | 9/2017 | Inoue |

FOREIGN PATENT DOCUMENTS

JP         2016045822 A     4/2016

OTHER PUBLICATIONS

Office Action issued in Chinese Appln. No. 201910575230.3 dated Sep. 1, 2021. English translation provided.

\* cited by examiner

*Primary Examiner* — Thomas D Lee
(74) *Attorney, Agent, or Firm* — Rossi, Kimms & McDowell LLP

(57) ABSTRACT

An image processing apparatus and a method of controlling the image processing apparatus are provided. The image processing apparatus sets whether or not a function provided in the image processing apparatus requires user authentication, and upon issuance of an instruction to activate an application, determines whether or not a function used by the application is set to require the user authentication. If it is determined that the function used by the application is set to require the user authentication, the image processing apparatus permits the application to use the function in a case that the user authentication has succeeded.

14 Claims, 11 Drawing Sheets

FIG. 5

```
┌─────────────────────────────────────────────────────────┐ 501
│ USER AUTHENTICATION                                     │
├─────────────────────────────────────────────────────────┤
│                                                         │
│  PLEASE INPUT ACCOUNT AND PASSWORD.                     │
│                                         502             │
│  ACCOUNT  [_____]   [INPUT]         │
│                                                         │
│  PASSWORD [_____]   [INPUT]         │
│                   503                                   │
│                                                         │
│                       504—[AUTHENTICATE]  [CANCEL]      │
│                                                         │
├─────────────────────────────────────────────────────────┤
│                                    ◈ STATUS CONFIRMATION│
└─────────────────────────────────────────────────────────┘
```

FIG. 6

```
┌─────────────────────────────────────────────────────────┐
│ USER AUTHENTICATION                                     │
├─────────────────────────────────────────────────────────┤
│                                                         │
│         ┌───────────────────────────────────┐           │
│         │  USER AUTHENTICATION FAILED.      │           │
│         │  THERE IS A MISTAKE IN ACCOUNT    │           │
│         │  OR PASSWORD.                     │           │
│         └───────────────────────────────────┘           │
│                                                         │
├─────────────────────────────────────────────────────────┤
│                                    ◇ STATUS CONFIRMATION│
└─────────────────────────────────────────────────────────┘
```

IMAGE PROCESSING APPARATUS INCLUDING USER AUTHENTICATION, METHOD OF CONTROLLING THE SAME, AND STORAGE MEDIUM

BACKGROUND OF THE INVENTION

Field of the Invention

The present invention relates to an image processing apparatus, a method of controlling the same, and a storage medium.

Description of the Related Art

Image forming apparatuses having a transmission function such as facsimile transmission, electronic mail transmission, and file transmission have become widespread. Also, there are known image forming apparatuses having a function of so-called authenticated transmission that can be set so as to request user authentication when a transmission function is used, in order to prevent transmission of highly confidential documents without permission, or identify a person who transmitted such documents.

Furthermore, in recent years, some image forming apparatuses that have come onto the market can have an optional application added thereto at a later time, in addition to a factory default application that can execute copy, facsimile transmission, and the like.

In such image forming apparatuses, in a case where the added application uses a transmission function and user authentication is required in using the transmission function, it is preferable that user authentication is requested in using the added application.

Japanese Patent Laid-Open No. 2016-45822 describes an image forming apparatus that can set whether or not user authentication is required in using an application, individually for each of a factory default application and an added application. Technology described in Japanese Patent Laid-Open No. 2016-45822 enables, for example, an administrator of the image forming apparatus to set whether or not user authentication is required in using an application on a per-application basis.

However, with the aforementioned conventional technology, an administrator who sets whether or not the user authentication is required in using an application needs to know whether or not the application uses a transmission function, with respect to every application. Furthermore, when a change has been made to the setting of whether or not the user authentication is required in using the transmission function, the setting of whether or not the user authentication is required at the time of use needs to be changed with respect to every application that uses the transmission function. If such a setting of whether or not to request the user authentication is erroneously configured, there is a possibility that unnecessary user authentication is requested in using an application that does not require user authentication, the transmission function is used without the user authentication even though the user authentication is required, and so on.

SUMMARY OF THE INVENTION

An aspect of the present invention is to eliminate the above-mentioned problem with conventional technology.

A feature of the present invention is to provide a technique that can, when a setting of whether or not user authentication is required is configured for a function used by an application, automatically reflect this setting in using the application.

According to a first aspect of the present invention, there is provided an image processing apparatus, comprising: a controller, having at least one processor which executes instructions stored in a memory, one or more circuitry, or, a combination of the at least one processor and the one or more circuitry, being configured to: set whether or not a function provided in the image processing apparatus requires user authentication; upon issuance of an instruction to activate an application, determine whether or not a function used by the application is set to require the user authentication; and if it is determined that the function used by the application is set to require the user authentication, permit the application to use the function in a case that the user authentication has succeeded.

According to a second aspect of the present invention, there is provided an image processing apparatus, comprising: a controller, having at least one processor which executes instructions stored in a memory, one or more circuitry, or, a combination of the at least one processor and the one or more circuitry, being configured to: cause an application framework to obtain a request for issuance of a token from an application; perform user authentication processing based on a setting whereby user authentication is required for a function used by the application; and issue a token to the application in a case that the user authentication has succeeded.

According to a third aspect of the present invention, there is provided a method of controlling an image processing apparatus, the method comprising: setting whether or not a function provided in the image processing apparatus requires user authentication; upon issuance of an instruction to activate an application, determining whether or not a function used by the application is set, in the setting, to require the user authentication; and if the determining has determined that the function used by the application is set to require the user authentication, permitting the application to use the function in a case that the user authentication has succeeded.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows a view illustrating an example of an authentication screen displayed on the display unit of the image forming apparatus according to the embodiment.

FIG. 6 shows a view illustrating an example of a screen that is displayed on the display unit of the image forming apparatus according to the embodiment when user authentication has failed.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Although the following embodiments describe an example of an image processing apparatus according to the present invention using an example of an image forming apparatus according to the embodiments, this image processing apparatus may be, for example, a communication apparatus or the like that does not have an image forming function.

Figure 1:
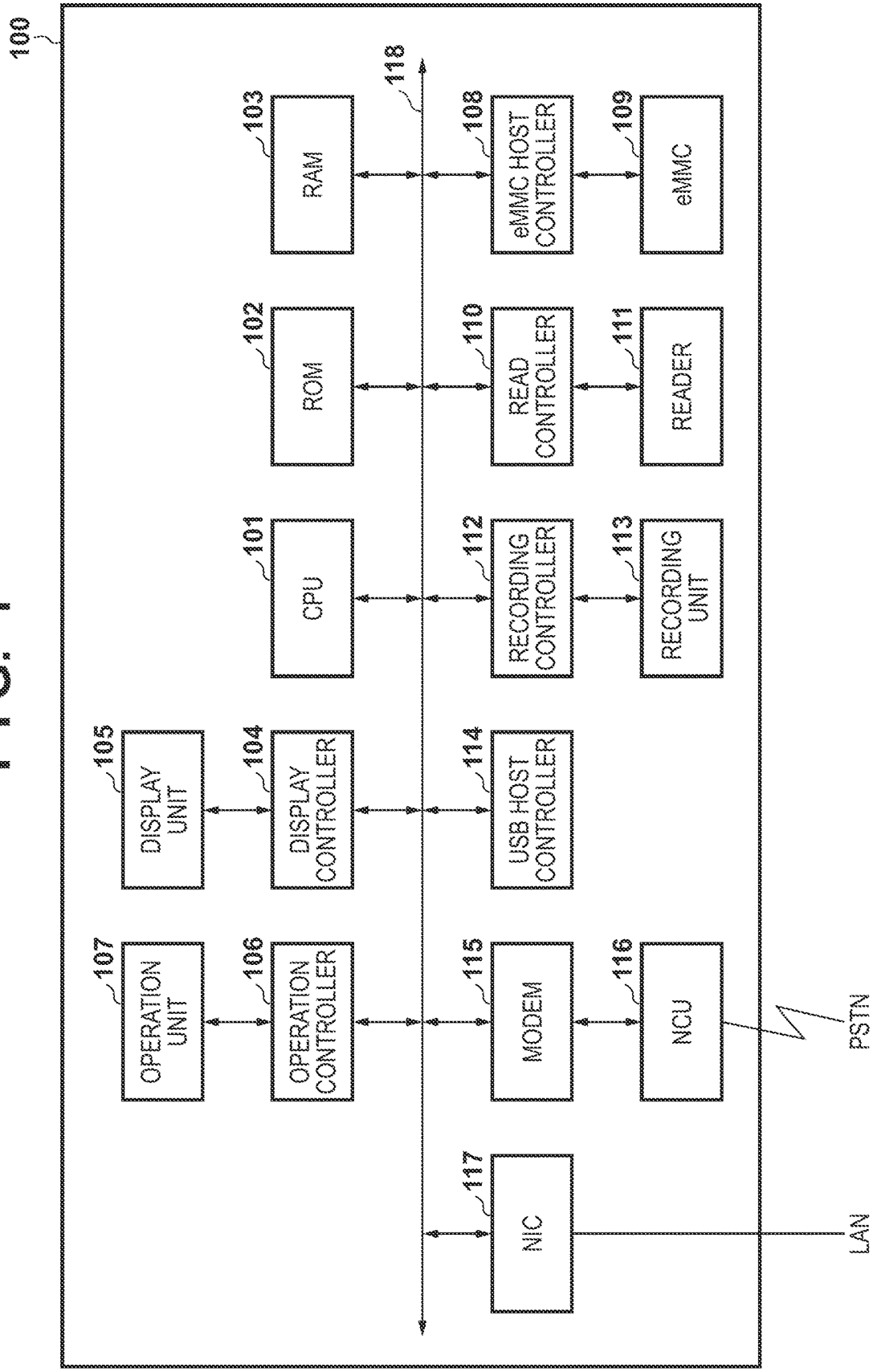
FIG. 1 is a block diagram for describing a hardware configuration of an image forming apparatus according to an embodiment.

FIG. 1 is a block diagram for describing a hardware configuration of an image forming apparatus according to an embodiment.

An image forming apparatus 100 includes a CPU 101, a ROM 102, a RAM 103, a display controller 104, a display unit 105, an operation controller 106, and an operation unit 107. The image forming apparatus 100 also includes an eMMC (Embedded Multi Media Card) host controller 108, an eMMC 109, a read controller 110, a reader 111, a recording controller 112, and a recording unit 113. The image forming apparatus 100 further includes a USB host controller 114, a modem 115, a network control unit (NCU) 116, and a network interface card (NIC) 117.

The CPU 101 performs overall control of each device connected to a system bus 118. When a power is supplied, the CPU 101 executes a boot program stored in the ROM 102. Normally, the boot program deploys a main program stored in a specific area of the eMMC 109 to the RAM 103, and jumps to the start of the deployed main program. The RAM 103 not only serves as a place in which the main program is loaded, but also provides a work area for the execution of the main program by the CPU 101.

The display controller 104 controls rendering on the display unit 105. The display unit 105 is a full bitmap display unit having a WVGA size. On the other hand, the operation controller 106 controls input from the operation unit 107. The operation unit 107 may be formed as a touchscreen overlaid on the display unit 105.

The reader 111 reads an original. The reader 111 is provided with an auto document feeder (not illustrated) as an option, and can automatically transport a plurality of originals and read them using a scanner. The reader 111 is connected to the read controller 110, and the CPU 101 communicates with the reader 111 via the read controller 110. The recording unit 113 forms (prints) an image on recording paper using an electrophotographic method. The recording unit (printer engine) 113 is connected to the recording controller 112, and the CPU 101 communicates with the recording unit 113 via the recording controller 112.

The USB host controller 114 is in charge of USB protocol control, and mediates access to a USB device such as a USB memory. The modem 115 performs signal modulation and demodulation that are required for facsimile communication. Furthermore, the modem 115 is connected to the NCU 116. A signal modulated by the modem 115 is transmitted to a public switched telephone network (PSTN) via the NCU 116. The NIC 117 exchanges data bidirectionally with a mail server and a file server via a LAN; this enables the image forming apparatus 100 to exchange electronic mails (Emails) and files.

The image forming apparatus 100 is connected to a computer (not shown), which is an external terminal, in such a manner that they can perform HTTP communication, and can accept the execution of a job such as printing from the computer. Furthermore, by accessing an IP address of the image forming apparatus 100 from a browser installed on this computer, a remote user interface (RUI) can be displayed on the browser. In addition, a user of this computer can inquire about the state of the image forming apparatus 100 and change the settings of the image forming apparatus 100 by operating the RUI. One example of this RUI will be described later with reference to FIGS. 7 to 10.

The image forming apparatus 100 according to the embodiment includes the eMMC 109 for storage. The CPU 101 accesses the eMMC 109 via the eMMC host controller 108.

Figure 2:
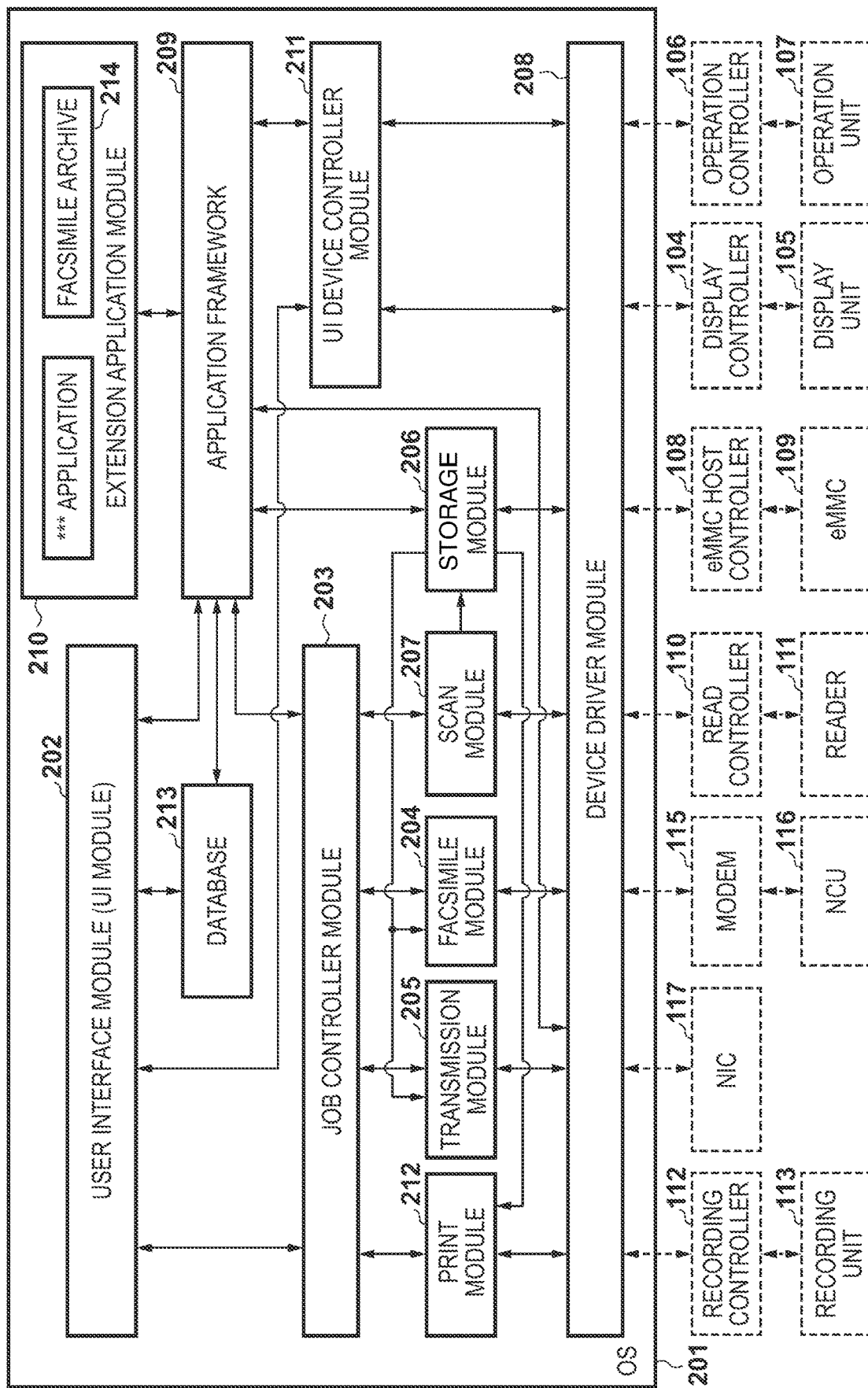
FIG. 2 is a functional block diagram for describing a software configuration of the image forming apparatus according to the embodiment.

FIG. 2 is a functional block diagram for describing a software configuration of the image forming apparatus 100 according to the embodiment. Each of the elements that are indicated by solid lines in FIG. 2 is a software module that is realized by the CPU 101 executing the main program that has been deployed to the RAM 103 by the aforementioned boot program.

An operating system (OS) 201 manages and controls the execution of each module by the main program. A device driver module 208 is incorporated in the OS 201. The device driver module 208 mediates exchanges with hardware devices such as the display controller 104, the operation controller 106, and the read controller 110.

A user interface module (UI module) 202 provides various types of information to a user and accepts various types of instructions from the user via the display unit 105 and the operation unit 107. Various types of settings for switching between behaviors of the image forming apparatus 100 can also be changed via the UI module 202 in accordance with a user's instruction. Various types of settings that have been changed by the UI module 202 are physically stored in the eMMC 109 via a database 213.

Upon accepting a job such as copy, printing, and facsimile, a job controller module 203 controls the execution of the accepted job. A storage module 206 is a software module that physically stores and manages, in the eMMC 109, image data to be exchanged by facsimile, and data of application settings and the like requested by an extension application module 210, for example.

In the image forming apparatus 100 according to the embodiment, when the job controller module 203 accepts a facsimile transmission job, a scan module 207 receives this transmission job and scans and reads an original by controlling the reader 111. Then, the storage module 206 stores image data obtained by the reading. The image data thus stored by the storage module 206 is read out by a facsimile module 204, and transmitted to a receiving party by facsimile via the modem 115 and the NCU 116. Image data that has been received from a transmitting party by facsimile via the modem 115 and the NCU 116 is imported by the facsimile module 204 and stored by the storage module 206. Upon accepting a print request, a print module 212 executes recording (printing) by controlling the recording unit 113 via the recording controller 112. A transmission module 205 controls facsimile transmission by the facsimile module 204 and transmission of image files, electronic mails, and the like.

Furthermore, the image forming apparatus 100 has a function of setting authentication for transmission functions (so-called authenticated transmission). When authenticated transmission is enabled, user authentication can be requested in using the transmission functions. The transmission functions include not only facsimile transmission, but also electronic mail transmission such as ScanToEmail, Internet facsimile (WAX), and file transmission such as ScanToSMB.

A UI device controller module 211 mediates output of various types of information from the UI module 202 and the extension application module 210 to the display unit 105, and transmission of a user operation performed via the operation unit 107 to the UI module 202 and the extension application module 210. Note that a facsimile archive 214 of the extension application module 210 and an application framework 209 will be described later.

Figure 3:
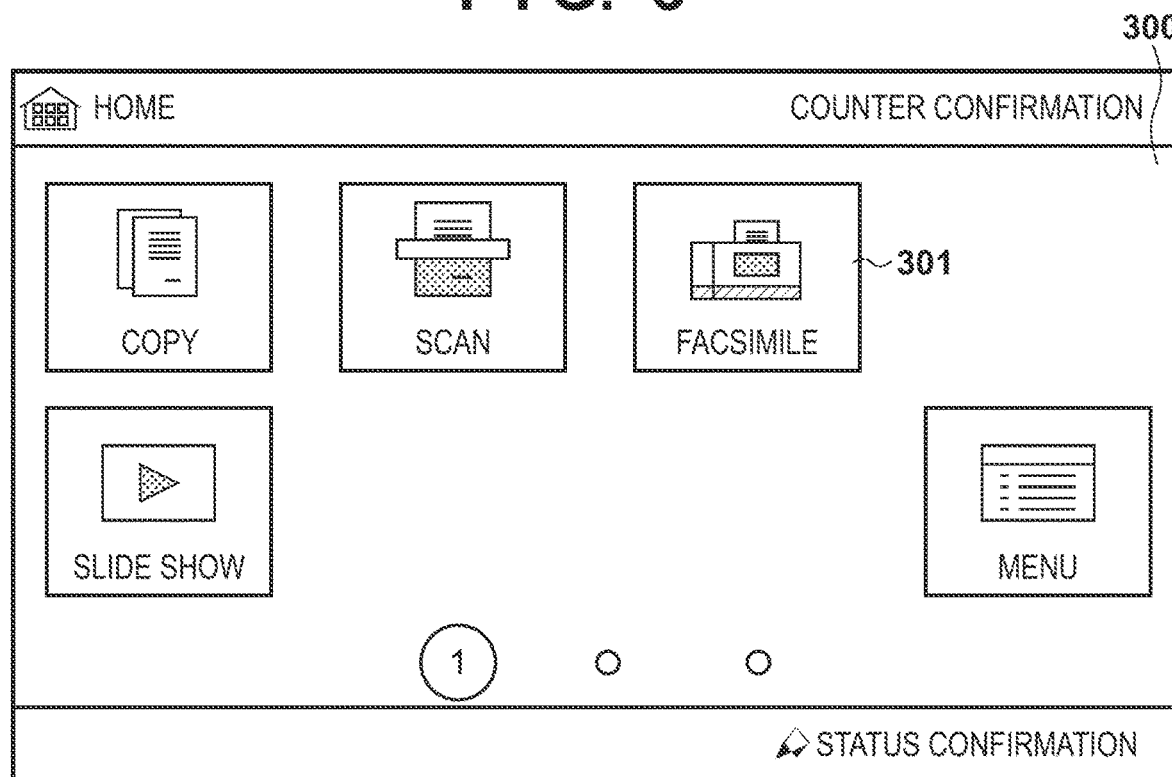
FIG. 3 shows a view illustrating an example of a home screen displayed on a display unit of the image forming apparatus according to the embodiment.

FIG. 3 shows a view illustrating an example of a home screen 300 displayed on the display unit 105 of the image forming apparatus 100 according to the embodiment.

The example of FIG. 3 represents an example of the home screen 300 displayed when there is no added application in the extension application module 210. Icons corresponding to applications of respective functions that are originally provided in the image forming apparatus 100 are arranged on the home screen 300. A facsimile icon 301 is an icon for using a facsimile transmission function. When the user designates the facsimile icon 301 on this home screen 300, the UI module 202 makes an inquiry to the database 213 about the setting of authenticated transmission. Here, if the setting of authenticated transmission is OFF, a facsimile transmission screen 401 of FIG. 4 is displayed.

Figure 4:
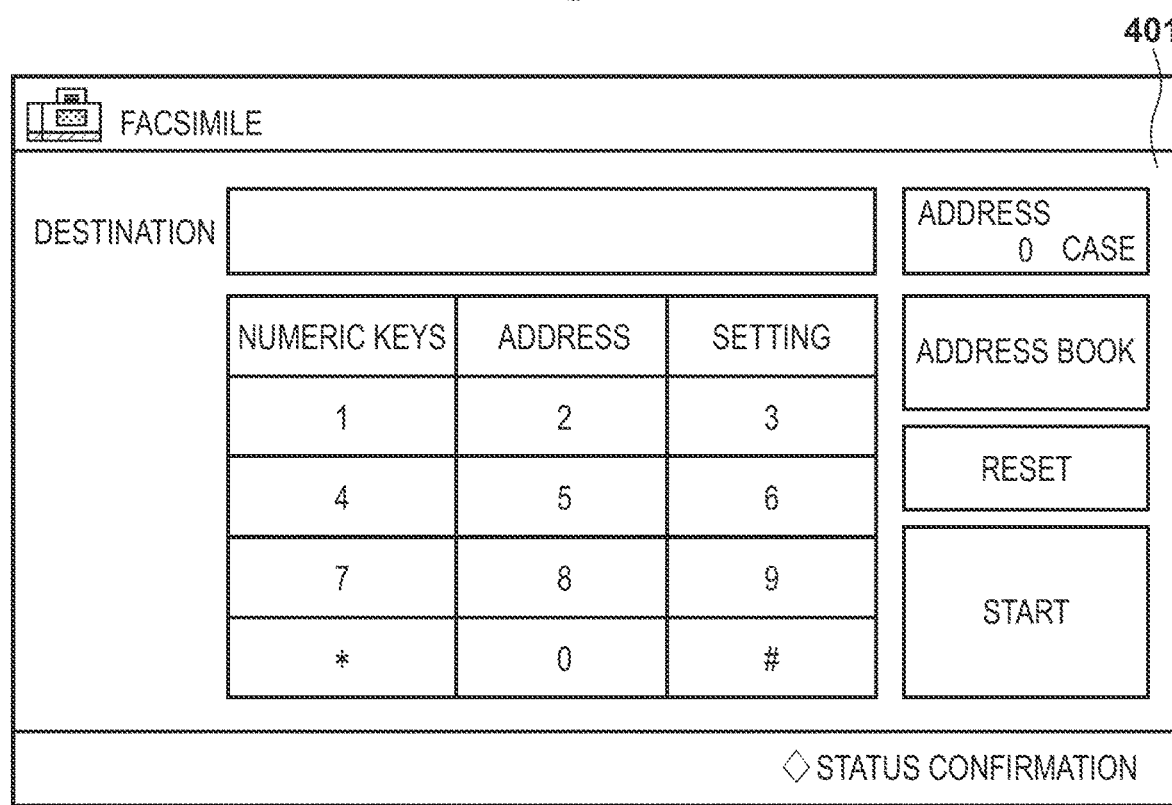
FIG. 4 shows a view illustrating an example of a facsimile transmission screen displayed on the display unit of the image forming apparatus according to the embodiment.

FIG. 4 shows a view illustrating an example of the facsimile transmission screen 401 displayed on the display unit 105 of the image forming apparatus 100 according to the embodiment.

The user can issue an instruction for facsimile transmission by designating an address of facsimile transmission using numeric keys, an address book, or the like, and then pressing down a start key via this screen.

On the other hand, if the setting of authenticated transmission is ON, a user authentication screen 501 shown in FIG. 5 is displayed.

FIG. 5 shows a view illustrating an example of the authentication screen 501 displayed on the display unit 105 of the image forming apparatus 100 according to the embodiment.

When the user inputs an account 502 and a password 503 and presses down an authentication button 504 on this screen, information thereof is transmitted from the image forming apparatus 100 to an LDAP authentication server, and the LDAP authentication server performs user authentication. Then, if user authentication succeeds, the facsimile transmission screen 401 of FIG. 4 is displayed. On the other hand, if user authentication fails, a user authentication failure screen of FIG. 6 is displayed on the display unit 105.

Note that although user authentication performed by the LDAP authentication server has been described above, the present invention is not limited to this; user information may be stored in the database 213, and the image forming apparatus 100 may execute user authentication based on this user information.

FIG. 6 shows a view illustrating an example of a screen that is displayed on the display unit 105 of the image forming apparatus 100 according to the embodiment when user authentication has failed.

As described above, by turning ON the setting of authenticated transmission, user authentication can be requested in using facsimile transmission, electronic mail transmission, and file transmission; this can prevent transmission of highly confidential documents without permission, and identify a person who transmitted such documents.

Next, the setting of authenticated transmission will be described with reference to FIGS. 7 to 10.

Figure 7:
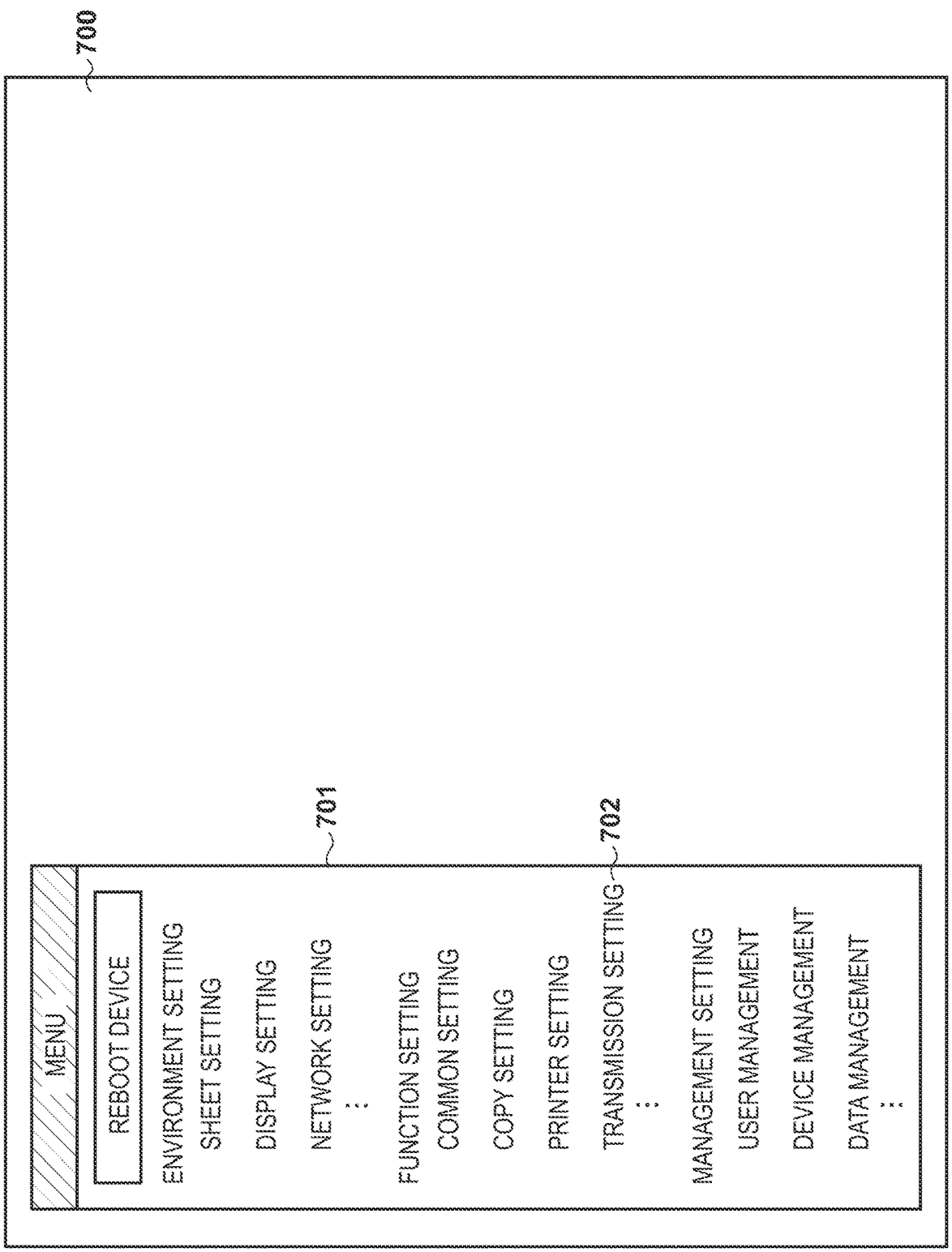
FIG. 7 shows a view illustrating an example of an RUI screen that is displayed on an external apparatus connected to the image forming apparatus according to the embodiment.

FIG. 7 shows a view illustrating an example of an RUI (remote user interface) screen that is displayed on an external apparatus connected to the image forming apparatus 100 according to the embodiment.

This figure shows an RUI screen 700 that is displayed as a web browser screen of the external apparatus by accessing the IP address of the image forming apparatus 100 from a web browser installed on a computer, which is an external terminal. This figure shows an example of a top screen at the time of login of a user to an RUI as an administrator. A menu 701 is displayed in an area on the left side of the RUI screen 700. Here, if the user clicks "transmission settings" 702 in the menu 701, a transmission settings dialogue 801 shown in FIG. 8 is displayed.

Figure 8:
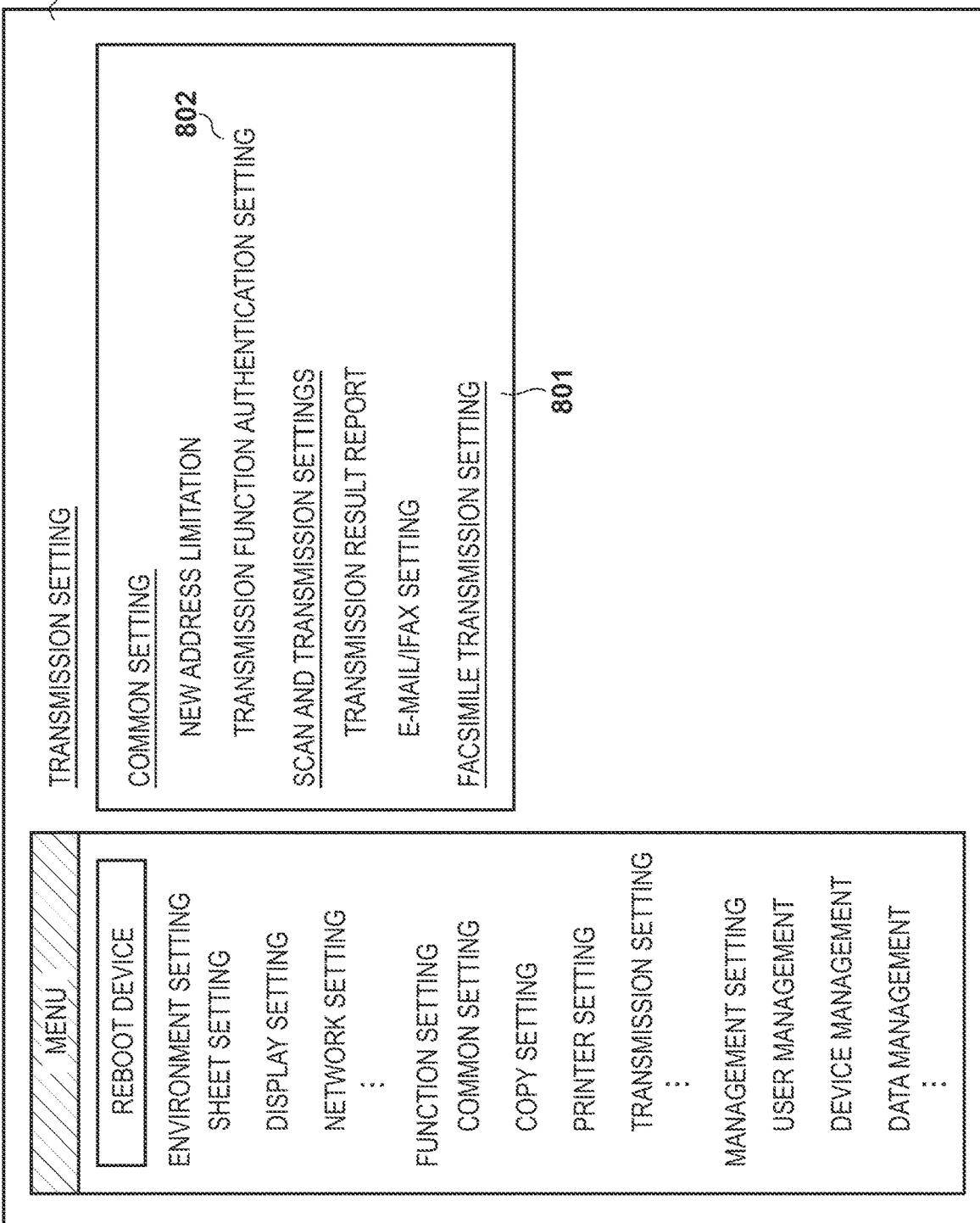
FIG. 8 shows a view illustrating a state where a transmission settings dialogue is displayed on the RUT screen.

FIG. 8 shows a view illustrating a state where the transmission settings dialogue 801 is displayed on the RUI screen 700.

Figure 9:
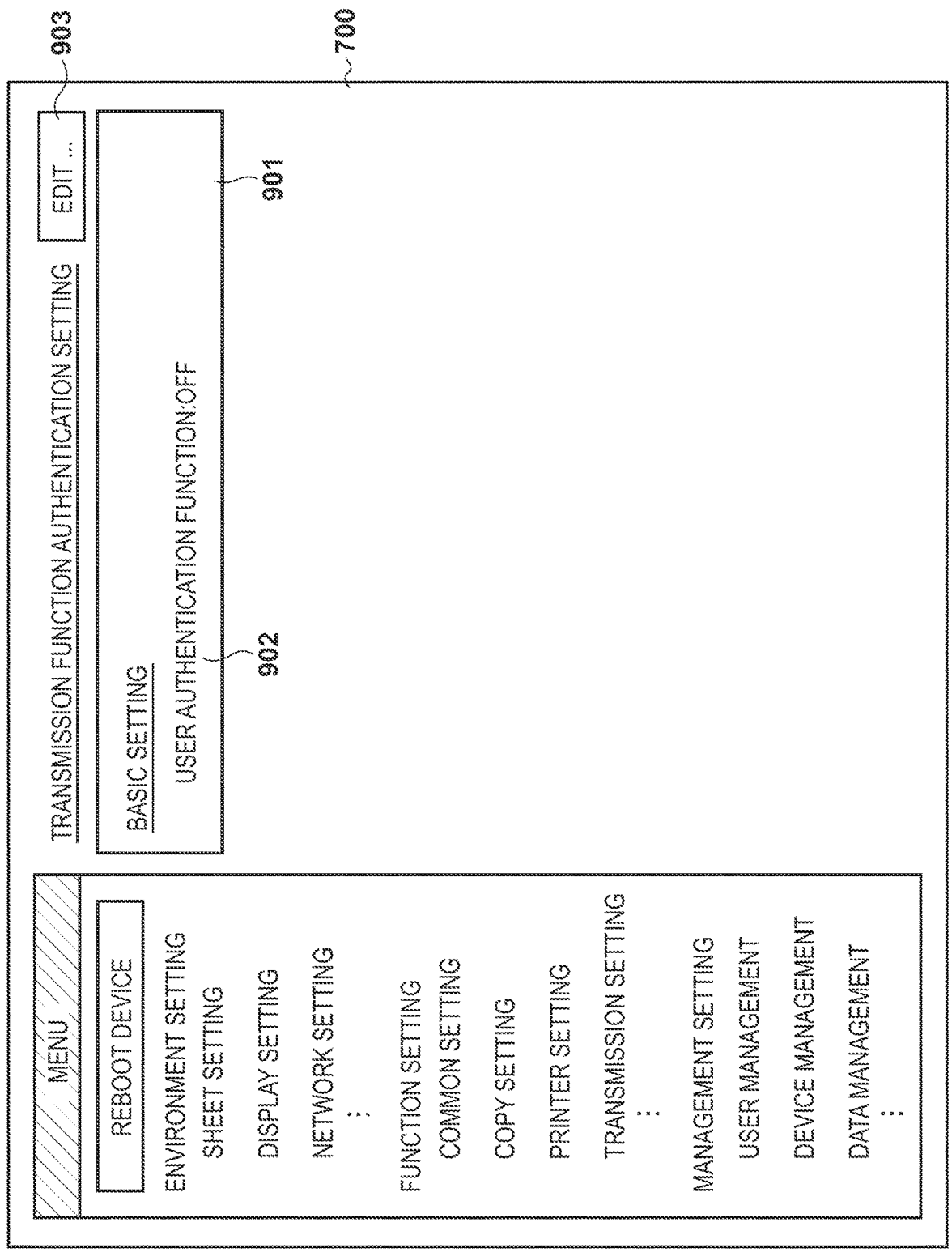
FIG. 9 shows a view illustrating a state where an authentication settings dialogue is displayed on the RUT screen.

To configure the setting of authenticated transmission here, it is required to click "authentication settings of transmission functions" 802 in this transmission settings dialogue 801 and display an authentication settings dialogue 901 for the transmission functions shown in FIG. 9.

FIG. 9 shows a view illustrating a state where the authentication settings dialogue 901 is displayed on the RUI screen 700.

As indicated by a user authentication function 902, a user authentication function is disabled (OFF) in a default state. To change this setting, the user clicks an edit button 903.

Figure 10:
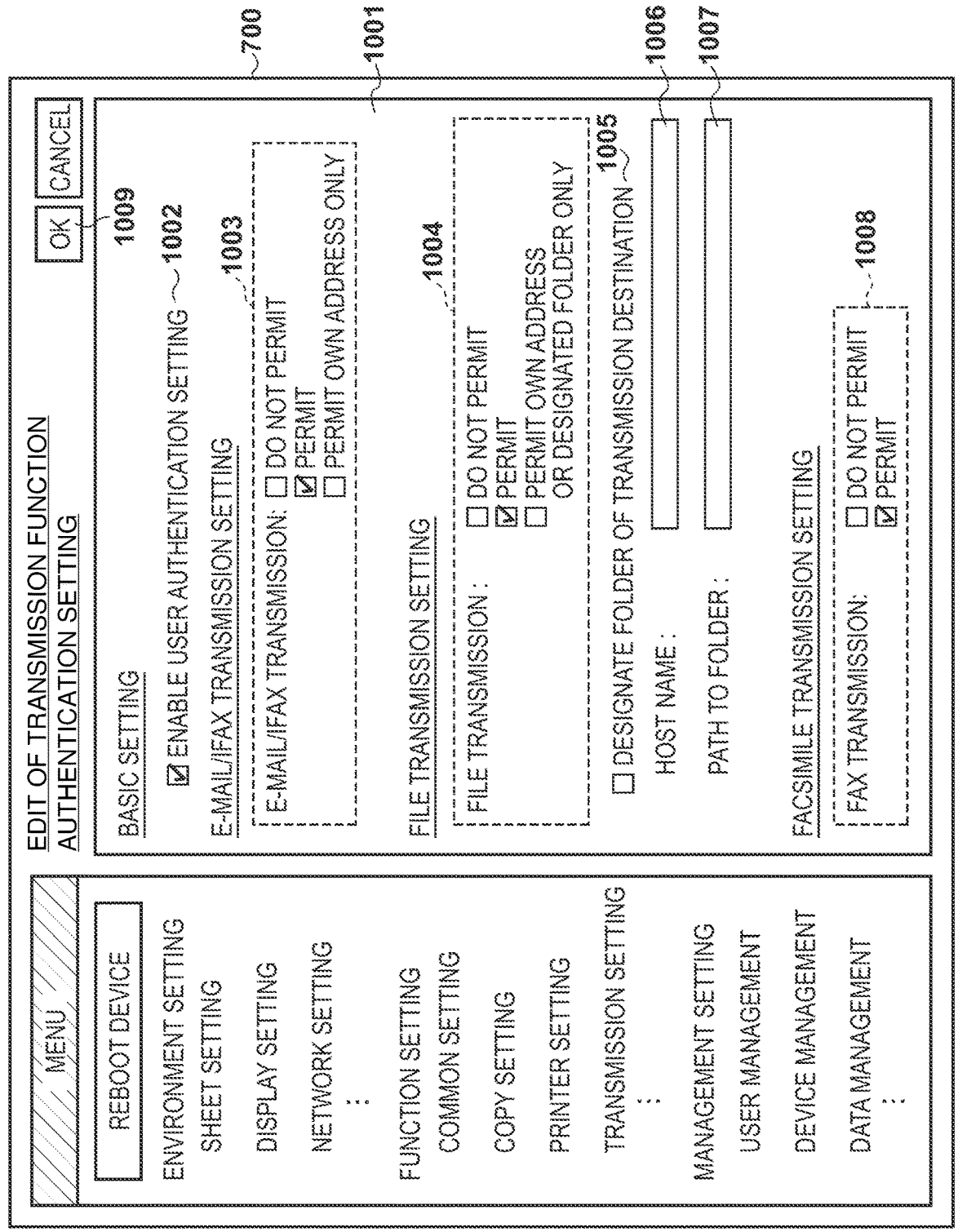
FIG. 10 shows a view illustrating an example of a dialogue for editing authentication settings of transmission functions displayed on the RUI screen.

FIG. 10 shows a view illustrating an example of a dialogue 1001 for editing the authentication settings of the transmission functions displayed on the RUI screen 700. This screen is displayed by pressing down the edit button 903 of FIG. 9.

On this screen, the user can set whether or not to require user authentication, and is able to enable the setting of user authentication (configure the setting so that user authentication is required) by checking a checkbox of "enable the setting of user authentication" 1002 under basic settings. Furthermore, by checking the checkbox of "enable the setting of user authentication" 1002, the user is able to set whether or not to permit transmission individually for each of Email/IFAX transmission, file transmission, and facsimile transmission. In the example of FIG. 10, "permit" is set for Email/IFAX transmission under an Email/IFAX transmission setting 1003, "permit" is set for file transmission under a file transmission setting 1004, and "permit" is set for facsimile transmission under a facsimile transmission setting 1008. Here, for example, regarding the file transmission setting 1004, selection can be made from among "do not permit", "permit", and "permit own address or designated folder only" with respect to the transmission. Here, if "do not permit" is selected, the file transmission is prohibited. If "permit" is selected, the file transmission to an optional address is permitted. If the user selects "permit own address or designated folder only" and checks a checkbox of "designate folder of transmission destination" 1005, the file transmission is permitted only to a folder designated by a host name 1006 and a path to folder 1007. On the other hand, if the checkbox of "designate folder of transmission destination" 1005 is not checked, the file transmission is permitted only to the own address.

By thus limiting a destination address for the file transmission only to the own address or a pre-designated folder, the file transmission to an inappropriate transmission destination can be prevented.

Under the Email/IFAX transmission setting 1003, selection can be made from among "do not permit", "permit", and "permit own address only". Under the facsimile transmission setting 1008, selection can be made from among "do not permit" and "permit". If an OK button 1009 is pressed down after completing the settings, the settings on this screen are reflected in the image forming apparatus 100. That is, the settings on this screen are stored in the eMMC 109 of the image forming apparatus 100.

Note that options for checkboxes under Email/IFAX transmission, file transmission, and facsimile transmission are not limited to the aforementioned options. For example, options under the Email/IFAX transmission setting 1003 may not include "permit own address only", and may include "permit designated address only". Furthermore, under the file transmission setting 1004, the option of "permit own address or designated folder only" may be separated into the following two options: "permit own address only" and "permit designated folder only", or the option of "permit own address or designated folder only" may not exist. Moreover, options under the facsimile transmission setting 1008 may include "permit own address only" and "permit designated address only".

As shown in FIG. 2, the image forming apparatus 100 according to the embodiment includes the application framework 209. The extension application module 210 is physically provided in the eMMC 109, and stores a plurality of applications such as an optional program described in a script language. For example, language systems such as Java™ and Lua, which are interpreters that interpret and execute bytecode, may be used. The application framework 209 is in charge of the role of installing an optional program described in a script language or a predetermined high-level programming language on the extension application module 210, or uninstalling such an optional program from the extension application module 210. At the same time, the application framework 209 retains, in the storage module 206, application status information that includes whether installed applications are enabled or disabled. The application framework 209 is also capable of, when the ROM 102 has an archive in which a plurality of pre-installed applications are compressed, decompressing and installing these applications on the extension application module 210 as necessary. In response to selection of a button displayed on the display unit 105, the application framework 209 deploys a script language of a corresponding application to the RAM 103, interprets its content, and executes processing.

In this way, the image forming apparatus 100 according to the embodiment is able to easily realize an optional function such as a login application and a language switching application while maintaining mountability and removability of the function. Furthermore, in response to a request from an optional program installed on the extension application module 210, the application framework 209 can refer to or change various types of setting values in the database 213.

Figure 11:
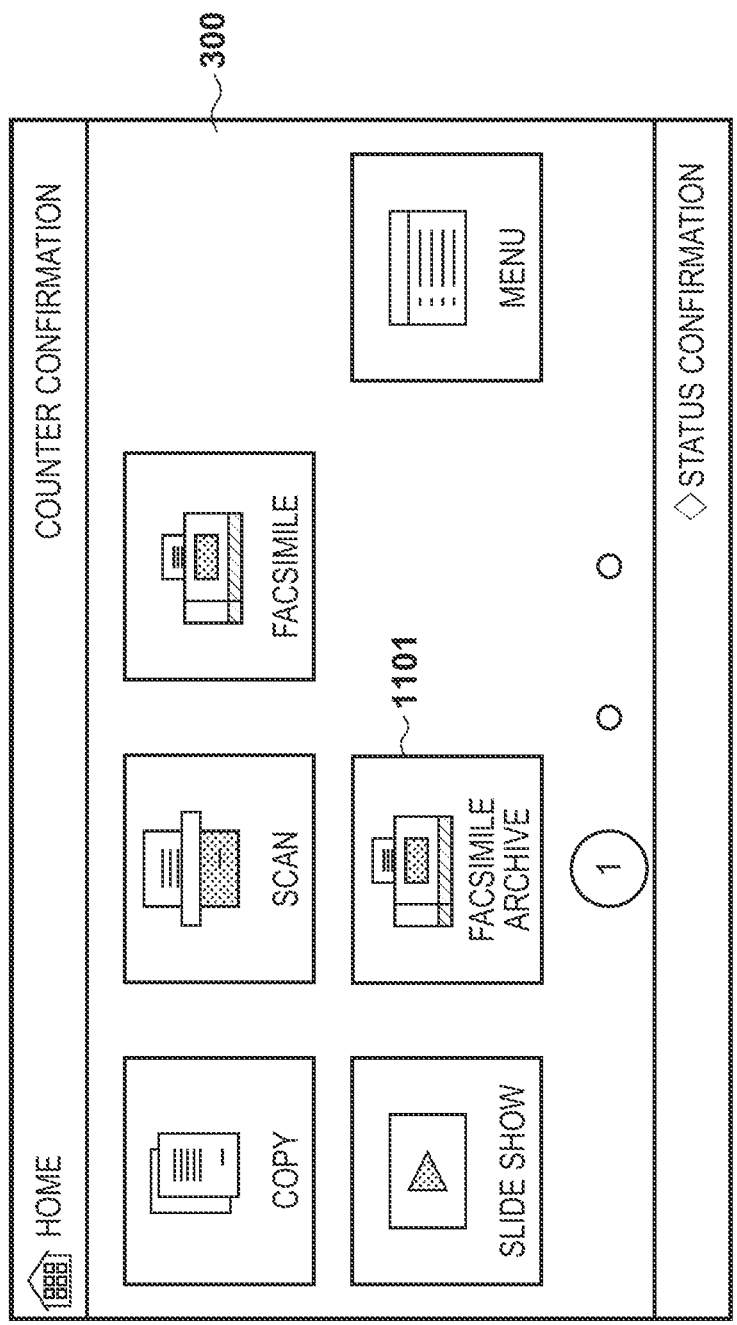
FIG. 11 shows a view illustrating an example of the home screen displayed on the display unit of the image forming apparatus according to the embodiment.

FIG. 11 shows a view illustrating an example of the home screen 300 displayed on the display unit 105 of the image forming apparatus 100 according to the embodiment.

This figure depicts a case where the facsimile archive 214 is installed on the extension application module 210, and a facsimile archive icon 1101 is displayed on the home screen 300. The execution of a program of the facsimile archive 214 is started by pressing down the icon 1101 displayed on this home screen 300. The facsimile archive 214 is an application that performs facsimile transmission to a pre-designated address, and at the same time, keeps the transmitted document at a pre-designated URL by electronic mail or file transmission using SMB or FTP. In this way, at the time of facsimile transmission of an important document to a client or an important customer, the evidence is able to be automatically kept in a desired location, and the transmitted document is able to be transmitted instead of reporting to the head office or the like.

The application framework 209 is in charge of mediation between a function realized by an optional program installed on the extension application module 210 and an existing function. As stated earlier, the image forming apparatus 100 are originally provided with functions of facsimile transmission, Email transmission, and file transmission. The application framework 209 provides these functions as application programming interfaces (APIs). In this way, an optional application installed on the extension application module 210 is able to be executed without newly implementing the functions of facsimile transmission, Email transmission, and file transmission.

Also in a case where an optional application installed on the extension application module 210 uses the functions of facsimile transmission, Email transmission, and file transmission, the above-described setting of authenticated transmission needs to be reflected. If this setting is not reflected, there is a possibility that unnecessary user authentication is requested, the transmission functions are used without performing user authentication even though user authentication is required, and so on.

In view of this, the application framework 209 of the image forming apparatus 100 according to the embodiment requires a token in using the APIs that provide the functions of facsimile transmission, Email transmission, and file transmission. The application framework 209 provides the APIs on which an application requests the application framework 209 for the token that is required in using the functions of facsimile transmission, Email transmission, and file transmission. At this time, the application framework 209 reflects the above-described setting of authenticated transmission at the time of issuance of the token. That is, in a case where the setting of authenticated transmission is OFF, the user authentication is not requested when the user executes an application that uses the APIs for facsimile transmission, Email transmission, and file transmission. On the other hand, in a case where the setting of authenticated transmission is ON, the user authentication is requested.

It is sufficient for an application developer to obtain a token, which is required in using the functions of facsimile transmission, Email transmission, and file transmission, via the APIs that request the token, and use this token at the time of use of the APIs for facsimile transmission, Email transmission, and file transmission. It is sufficient for the application developer to only know that the APIs for facsimile transmission, Email transmission, and file transmission are used after the token is obtained, and the application developer need not know whether or not the user authentication is required in using the functions of facsimile transmission, Email transmission, and file transmission.

In this way, an optional application installed on the extension application module 210 can use the functions of facsimile transmission, Email transmission, and file transmission that are originally provided in the image forming apparatus 100. Furthermore, the application framework 209 reflects the above-described setting of authenticated transmission at the time of issuance of a token required in using the functions of facsimile transmission, Email transmission, and file transmission. It is possible to prevent the APIs for facsimile transmission, Email transmission, and file transmission from being used without the user authentication even though the user authentication is required.

Figure 12:
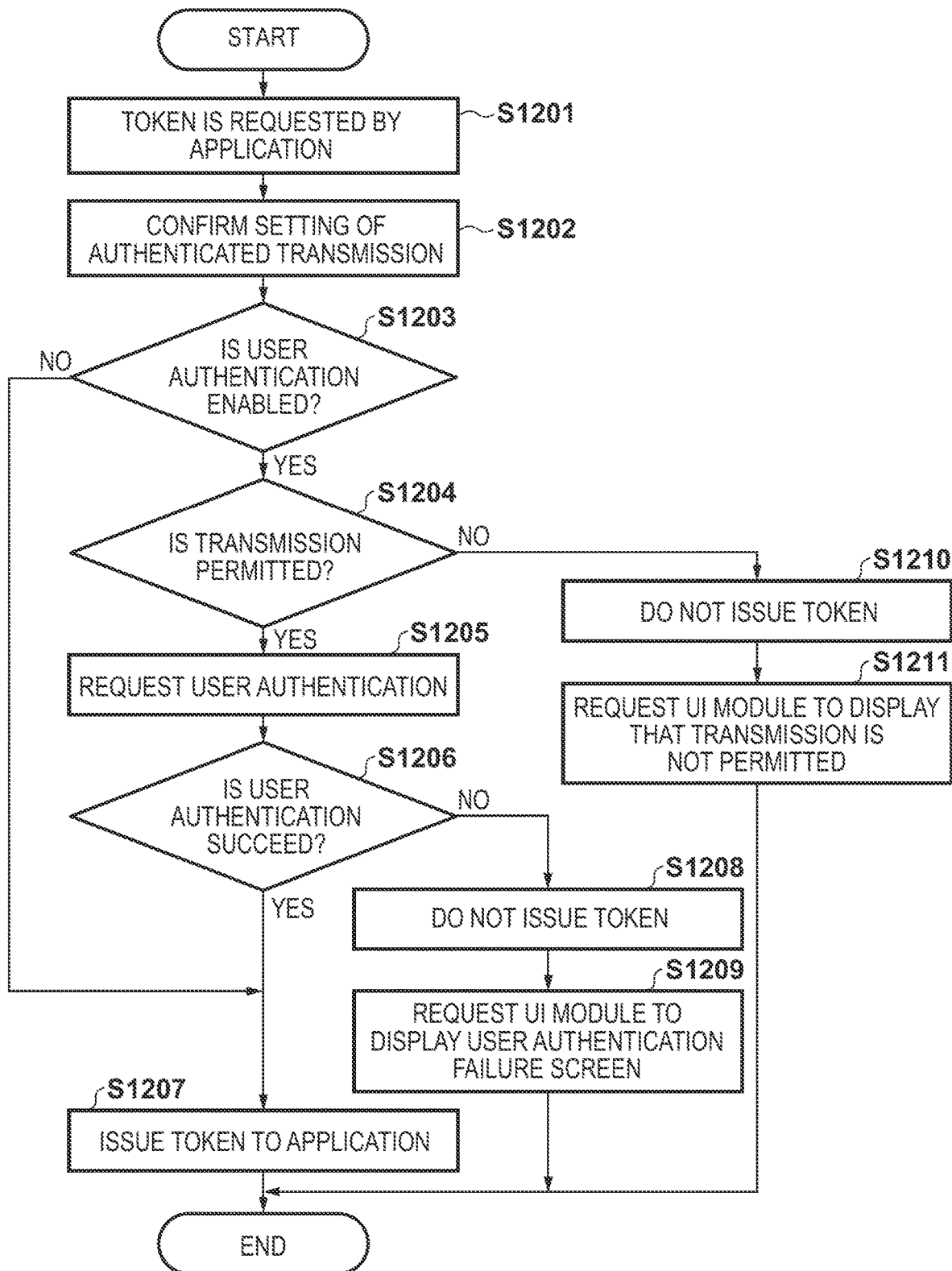
FIG. 12 is a flowchart for describing the operations of an application framework for a case where a token is requested by an application on the image forming apparatus according to the embodiment.

FIG. 12 is a flowchart for describing the operations of the application framework 209 for a case where a token is requested by an application on the image forming apparatus 100 according to the embodiment. Note that this processing is achieved by the CPU 101 executing a program deployed to the RAM 103. As the following is realized by the CPU 101 functioning as the application framework 209, the CPU 101 will be described as a main executor (a subject) of each process.

First, when an application that uses a transmission function has requested a token in step S1201, the processing proceeds to step S1202 and the CPU 101 makes an inquiry to the database 213 about the setting of authenticated transmission. Then, the processing proceeds to step S1203, and if the CPU 101 determines that the setting of authenticated transmission stored in the eMMC 109 is OFF, that is, the user authentication is not required in using the functions of facsimile transmission, electronic mail transmission, and file transmission, the CPU 101 advances the processing to step S1207, and the CPU 101 issues a token to the application without requesting the user authentication, and ends the present processing.

On the other hand, if the CPU 101 determines in step S1203 that the setting of authenticated transmission is ON, that is, the user authentication is required in using the transmission function, the processing proceeds to step S1204. In step S1204, the CPU 101 refers to the eMMC 109 and determines whether or not "permit" is set for this transmission function under the transmission settings on the screen of FIG. 10. If it is determined that "permit" is set here, the processing proceeds to step S1205 and the CPU 101 requests the UI module 202 for user authentication. That is, for example, the user authentication screen shown in FIG. 5 is displayed, and if an account and a password that have been input by the user on this screen are registered, it is determined that user authentication has succeeded. Note that the information input here may be transmitted to the LDAP authentication server, and the authentication result may be obtained from the LDAP authentication server. Then, the processing proceeds to step S1206 and the CPU 101 determines whether or not the result of user authentication is a success; if it is determined that authentication has succeeded here, the processing proceeds to step S1207 and the CPU 101 issues a token to this application, and ends the present processing.

On the other hand, if it is determined in step S1206 that the result of user authentication is a failure, the processing proceeds to step S1208 and the CPU 101 does not issue a token. Then, the processing proceeds to step S1209 and the CPU 101 requests the UI module 202 to display a message indicating that user authentication has failed, and ends the present processing.

On the other hand, if "do not permit" is set for this transmission function in step S1204, the processing proceeds to step S1210 and the CPU 101 does not issue a token. Then, the processing proceeds to step S1211 and the CPU 101 requests the UI module 202 to display a message indicating that transmission is not permitted under the transmission settings, and ends the present processing.

As described above, designating an icon on a menu screen activates an application corresponding to this icon. Then, if this application requests a token for using an API, it is determined whether or not a user authentication setting has been configured with respect to a function of this API, and if it is determined that the authentication setting has been configured, the token is issued only when user authentication has succeeded. This is able to prevent, for example, the APIs for facsimile transmission, Email transmission, and file transmission from being used without the user authentication even though the user authentication is required.

Note that although the above embodiment has described the authentication settings of the transmission functions as an example, the present invention is not limited to this, and whether or not to enable the authentication settings may be settable also with respect to functions of storing in a storage device, printing, and the like. Processing for this case can be executed similarly to the above-described manner, simply by replacing the transmission functions with a storing function or a printing function.

Figure 13:
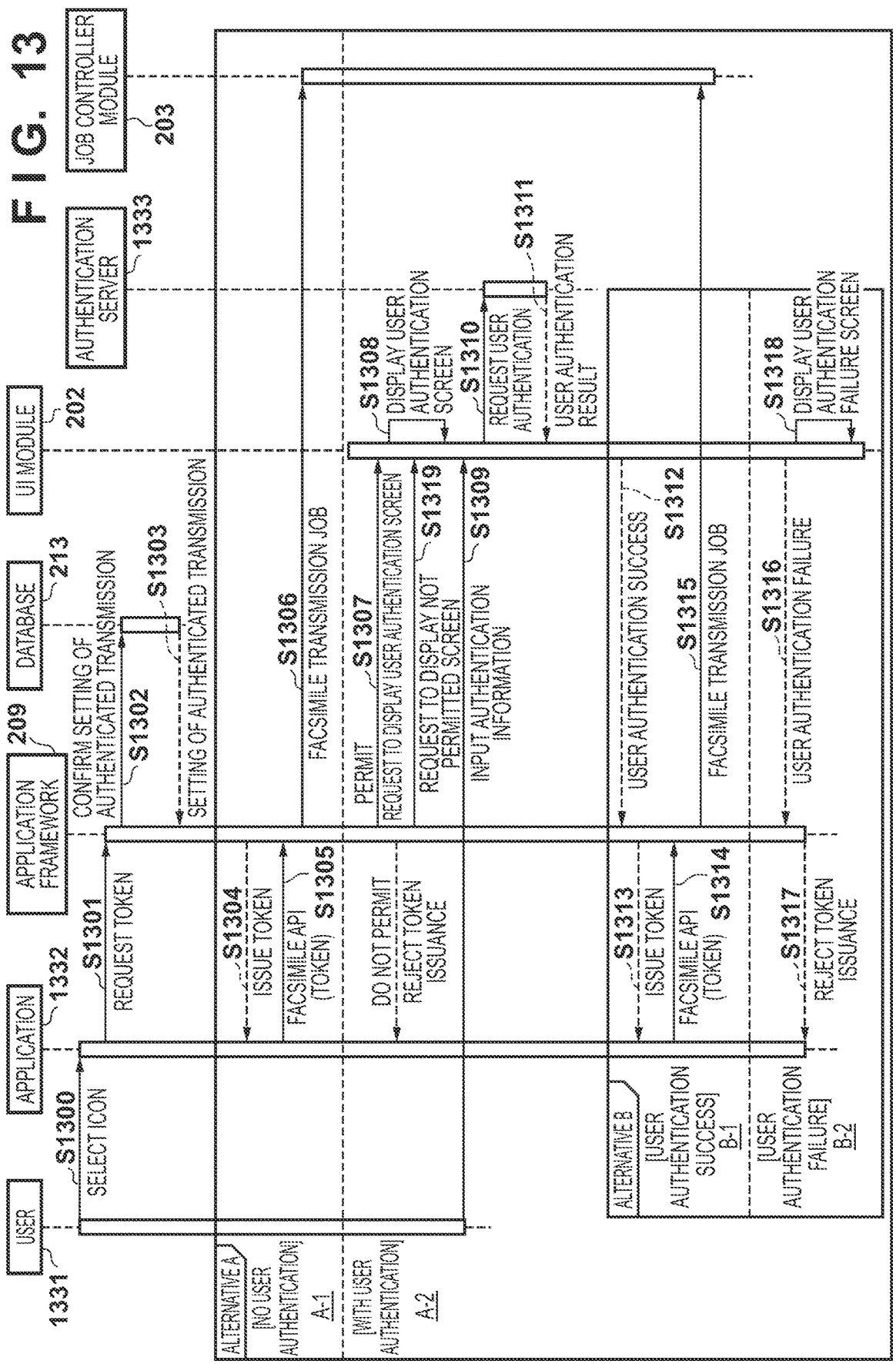
FIG. 13 is a sequence diagram for describing the flow of processing for a case where a user has executed an application that uses an API for facsimile transmission on the image forming apparatus according to the embodiment.

FIG. 13 is a sequence diagram for describing the flow of processing for a case where the user has executed an application that uses the API for facsimile transmission on the image forming apparatus 100 according to the embodiment. Although facsimile transmission is discussed here as an example, a similar sequence is executed also in the cases of Email transmission and file transmission. In FIG. 13, portions that are the same as in the above-described FIG. 2 are given the same reference numerals thereas.

First, in step S1300, a user 1331 selects an icon on a menu screen displayed on the display unit 105. As a result, in step S1301, an application 1332 corresponding to the icon requests the application framework 209 for a token for using the APIs for facsimile transmission, Email transmission, and file transmission. Accordingly, in step S1302, the application framework 209 makes an inquiry to the database 213 about the setting of authenticated transmission for this transmission function. Then, in step S1303, the database 213 informs the application framework 209 of the content of the setting of authenticated transmission.

Here, if the setting of authenticated transmission is OFF (that is, user authentication is not required), processing of A-1 of an alternative A will be executed. That is, in step S1304, the application framework 209 issues a token to the application 1332. Then, in step S1305, the application 1332 uses the facsimile API using this token. Here, once the application framework 209 has confirmed that the token has been issued by itself, the application framework 209 requests the job controller module 203 for processing of a facsimile transmission job in step S1306.

On the other hand, if the setting of authenticated transmission is ON (that is, user authentication is required), processing of A-2 of the alternative A will be executed. Here, in step S1307, the application framework 209 determines whether or not "permit" is set as the transmission setting with respect to this transmission function, and if "permit" is set, the application framework 209 requests the UI module 202 to display the user authentication screen 501 (see FIG. 5). Note that this user authentication screen 501 may be the same as the one for using, for example, the transmission function of the aforementioned conventional facsimile transmission, or may be prepared separately. Accordingly, in step S1308, the UI module 202 displays the user authentication screen 501 on the display unit 105. Then, in step S1309, input of the account 502 and the password 503 and pressing down of the authentication button 504 by the user 1331 are confirmed. As a result, in step S1310, these account and password are transmitted to an authentication server 1333, and the user authentication is requested to the same. Then, in step S1311, the authentication server 1333 returns the result of this user authentication to the UI module 202.

On the other hand, in step S1307, if "do not permit" is set as the transmission setting with respect to this transmission function, the application framework 209 does not issue a token to the application 1332. In this case, the UI module 202 is caused to display, on the display unit 105, a screen indicating that the function used by this application is not permitted.

If user authentication has succeeded in step S1311, processing of B-1 of an alternative B will be executed. In step S1312, the UI module 202 informs the application framework 209 of successful user authentication. As a result, in step S1313, the application framework 209 issues a token to the application 1332. Then, in step S1314, the application 1332 requests the application framework 209 for the use of the facsimile API using this token. Once the application framework 209 has confirmed that this token has been issued by itself, the application framework 209 requests the job controller module 203 for processing of a facsimile transmission job in step S1315.

On the other hand, if the user authentication has failed, processing of B-2 of the alternative B will be executed. In step S1316, the UI module 202 informs the application framework 209 of failed user authentication. In this case, in step S1317, the application framework 209 does not issue a token. Then, in step S1318, the UI module 202 is caused to display, on the display unit 105, a screen indicating that user authentication has failed (see FIG. 6).

As described above, according to the embodiment, it is sufficient for the application developer to only know that a token is obtained in using the APIs for transmission functions such as facsimile transmission, Email transmission, and file transmission, and that the APIs are used using this token.

Furthermore, when a token for using an API is requested, the application framework determines whether or not the authentication setting is configured with respect to a function of this API, and performs the user authentication if the authentication setting is configured. In this way, in a case where an added application uses, for example, a transmission function, the setting of whether or not the user authentication is required in using the transmission function is confirmed, and if the setting requires the user authentication, the user authentication is requested at the time of use of the application. Then, a token for using the API can be issued only when the user authentication has succeeded. This can prevent, for example, the APIs for facsimile transmission, Email transmission, and file transmission from being used without the user authentication even though the user authentication is required.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-125291, filed Jun. 29, 2018, which is hereby incorporated by reference herein in its entirety.

What is claimed is:

1. A method of controlling an image processing apparatus having an operation unit, the method comprising:
   selecting an application via the operation unit;
   sending a request for obtaining a token to use a function from the selected application to an application framework;
   confirming whether or not to require a user authentication to use the function;
   if the user authentication is required, performing the user authentication;
   sending the token from the application framework to the selected application in accordance that the user authentication has succeeded;

and
executing the selected application to perform the function with the token,
wherein the function includes at least one of facsimile transmission, Email transmission, IFAX transmission, and file transmission.

2. The method according to claim 1, wherein the function provided in the image processing apparatus is a factory-mounted function of the image processing apparatus, and wherein in a case that the application is permitted to use the function, the application framework provides the application with the token for using an API that provides the function.

3. The method according to claim 1, wherein user information input by a user is transmitted to an authentication server, and the user authentication is executed based on a result of authentication by the authentication server.

4. The method according to claim 1, wherein the application framework sets whether or not to require the user authentication via a web browser screen that is displayed on an external apparatus by accessing an IP address of the image processing apparatus from a web browser of the external apparatus.

5. The method according to claim 1, wherein in a case that the function used by the application is set to require the user authentication, the application framework further sets whether or not to permit a use of the function, and
wherein in a case that the use of the function is set to be permitted, the application framework permits the application to use the function in a case that the user authentication has succeeded.

6. The method according to claim 1, further comprising:
if the user authentication is not required, sending the token from the application framework to the selected application without performing the user authentication.

7. An image processing apparatus having an operation unit, the image processing apparatus comprising:
a controller, having one or more processors that execute instructions stored in a memory, one or more circuitry, or a combination of the one or more processors and the one or more circuitry, being configured to:
select an application via the operation unit;
request a token for using a function to an application framework by executing the selected application;
cause the application framework to confirm whether or not to require a user authentication to use the function;
if the user authentication is required, perform the user authentication;
cause the application framework to issue the token in accordance that the user authentication has succeeded; and
cause the selected application to execute to perform the function with the token,
wherein the function includes at least one of facsimile transmission, Email transmission, IFAX transmission, and file transmission.

8. The image processing apparatus according to claim 7, wherein the function provided in the image processing apparatus is a factory-mounted function of the image processing apparatus, and wherein in a case that the application is permitted to use the function, the controller provides the application with the token for using an API that provides the function.

9. The image processing apparatus according to claim 7, wherein user information input by a user is transmitted to an authentication server, and the user authentication is executed based on a result of authentication by the authentication server.

10. The image processing apparatus according to claim 7, wherein the controller sets whether or not to require the user authentication via a web browser screen that is displayed on an external apparatus by accessing an IP address of the image processing apparatus from a web browser of the external apparatus.

11. The image processing apparatus according to claim 7, wherein in a case that the function used by the application is set to require the user authentication, the controller further sets whether or not to permit a use of the function, and
wherein in a case that the use of the function is set to be permitted, the controller permits the application to use the function in a case that the user authentication has succeeded.

12. The image processing apparatus according to claim 7, wherein the controller being further configured to:
if the user authentication is not required, cause the application framework to issue the token without performing the user authentication.

13. A method of controlling an image processing apparatus having an operation unit, the method comprising:
selecting an application via the operation unit;
sending a request for obtaining a token to use a function from the selected application to an application framework;
confirming whether or not to require a user authentication to use the function;
if the user authentication is required, performing the user authentication;
sending the token from the application framework to the selected application in accordance that the user authentication has succeeded; and
executing the selected application to perform the function with the token,
wherein the application is an application that has been additionally installed in the image processing apparatus as an extension application.

14. An image processing apparatus having an operation unit, the image processing apparatus comprising:
a controller, having one or more processors that execute instructions stored in a memory, one or more circuitry, or a combination of the one or more processors and the one or more circuitry, being configured to:
select an application via the operation unit;
request a token for using a function to an application framework by executing the selected application;
cause the application framework to confirm whether or not to require a user authentication to use the function;
if the user authentication is required, perform the user authentication;
cause the application framework to issue the token in accordance that the user authentication has succeeded; and
cause the selected application to execute to perform the function with the token,
wherein the application is an application that has been additionally installed in the image processing apparatus as an extension application.

* * * * *